April 9, 1935.   M. J. MARTIN   1,997,114
FILTRATION AND CLARIFICATION OF WATER
Filed Sept. 19, 1931
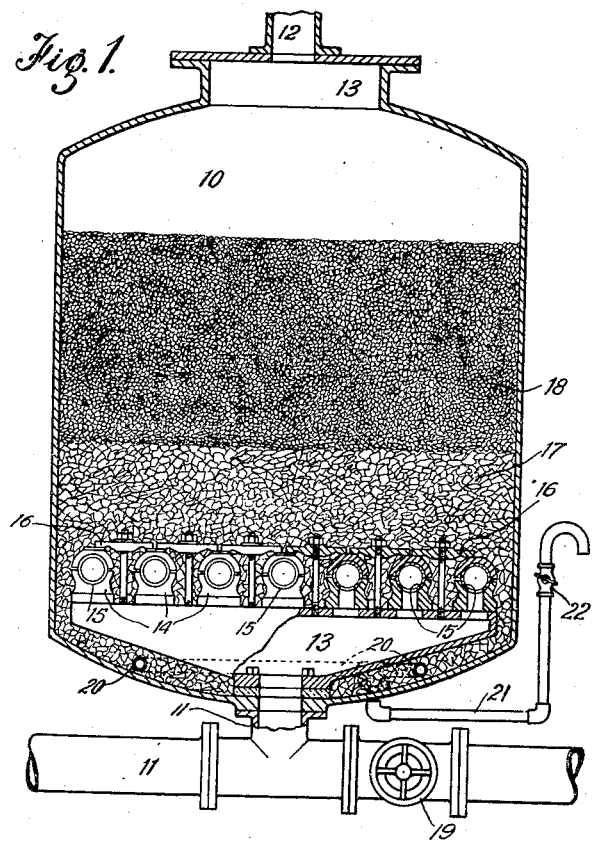
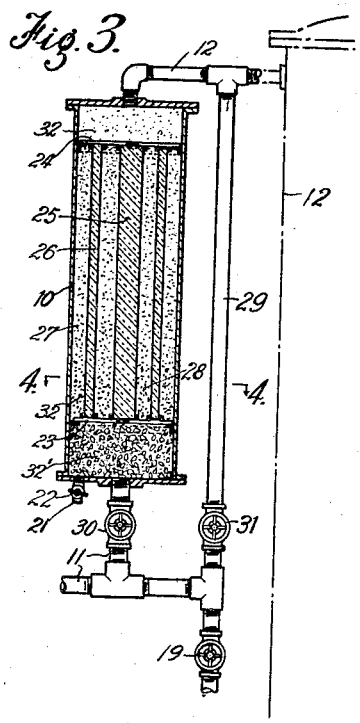
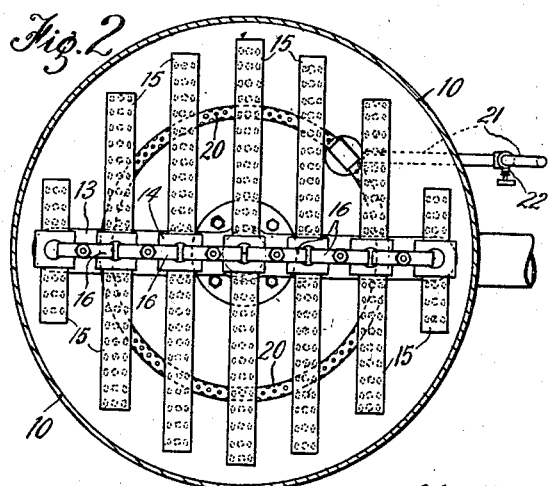
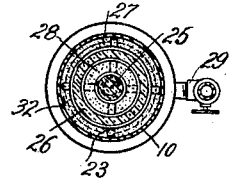
Inventor:
Michael James Martin
By Williams, Bradbury, McCaleb & Hinkle, Attys.

Patented Apr. 9, 1935

1,997,114

UNITED STATES PATENT OFFICE 1,997,114

FILTRATION AND CLARIFICATION OF WATER

Michael James Martin, Armadale, Victoria, Australia

Application September 19, 1931, Serial No. 563,711
In Australia September 29, 1930

12 Claims. (Cl. 210—16)

This invention relates to improvements in and connected with the filtration and clarification of water and refers especially to filtration by plants of the pressure or gravity type wherein the raw water is treated with chemicals to coagulate impurities therein and is then passed through one or more filter beds of graded sand and gravel.

The invention may, however, be employed in connection with the clarification of water accomplished wholly or in part by allowing the water to settle after treatment with coagulants, so that the coagulated impurities are removed by sedimentation.

Some of the coagulants in general use for the purpose above mentioned—e. g. alums and aluminium sulphate, alumino ferric-, ferrous- and ferric sulphates and ferric chloride, produce aqueous solutions having an acid reaction, that is, the hydrogen ion concentration when expressed in pH units lies between pH1 and pH7. This may be due either to excessive amounts of coagulant which, on hydrolysis will given an acid pH value varying according to the nature and the amount of the chemical present in the water, or it may be due entirely to the hydrolyzed reaction products formed in the coagulation of the water, though the coagulant may not be in excess and may have been added in the correct quantity.

For many reasons it is desirable to control the pH value of the water (during and after filtration or clarification) between certain pH values, in practice pH4 to pH9, it, of course, being understood that pH values exceeding pH7 indicate alkalinity. In exceptional circumstances it may be desired to carry the correction to a greater degree of pH alkalinity than expressed by pH9.

In order that the acidity of the filtered or clarified water will be within prescribed limits, it is consequently desirable that the amount of coagulant introduced should not be in excess of what is necessary to react with the impurities in the water.

On the other hand, if an insufficient amount of coagulant is employed, complete coagulation of impurities will not take place and filtration will be inefficient.

In view of these circumstances, it is necessary to determine fairly accurately the amount of coagulant to be introduced, and the valves or other feeding devices employed require to be accurately constructed and carefully adjusted to supply this amount.

This accurate adjustment of the feeding valves occasions some difficulty, particularly in the case of filters having a relatively small output.

It is also found that, in some cases, the raw water requires a relatively large excess of coagulant in order to ensure effective coagulation of the impurities and, under these circumstances, the filtered water has an acid reaction which renders it unsatisfactory for certain industrial operations, unless some compensation is made for the products of reaction of the excess of coagulant used.

Now, one object of the present invention is to provide means for automatically controlling the pH value of water subjected to filtration or clarification. This correction may be necessary to compensate for any excess of coagulant delivered to the raw water or for the natural acidity of the water, or to produce an alkaline condition therein.

I accomplish these objects by first treating the raw water with one or more coagulants in the usual way and in then bringing same into contact with one or more alkaline substances which are only slightly soluble in neutral water (pH7) but which are increasingly soluble in water having an acid reaction (i. e. below pH7), or an excess of a coagulant producing acid conditions.

In this way, the amount of the reacting alkaline substance which goes into solution is automatically determined by the degree of acidity of the water after the coagulation of the impurities, so that compensation is effected if any excess of coagulant has been used.

The reacting substance may comprise any natural, artificial or synthetic substances having the requisite properties, such for example as limestone (calcium carbonate) or magnesite (magnesium carbonate), dolomite, marble chips, "hard" or "dead" burnt magnesite, alkali silicates, alkaline earth silicates (such as Portland cement slag and slags of similar character), and those calcium aluminate slags having the required properties.

The material or a mixture of reacting materials are so arranged as to provide a sufficiently large reacting surface to the action of the water, and for this purpose it is preferably granulated whereby it will also serve as a preliminary strainer, thus relieving, to some extent, the filter bed proper.

When an alkali silicate, such as sodium silicate, is employed as the reacting material, silicic acid is formed in a gelatinous condition and some of this substance passes into the filter chambers and is deposited on the bed therein, thus assisting in the formation of the filtering film. Silicic acid also forms on the surface of the sodium silicate, and, to some extent, retards the reaction between the water and the said reagent.

In some cases this film may have a beneficial action but, under certain circumstances, in order to ensure the acidity of the water being effectively corrected, it may be found necessary, before or after passing the water through the bed of alkaline silicate, to pass it through an additional bed of reacting material, such for example as limestone.

The water to be treated is preferably passed upwardly at a relatively high velocity through the bed of reacting material whereby said bed is normally maintained in a state of partial suspension so as to ensure any light solid residues of the material being ultimately carried away by the water and deposited on the filter bed. These residues are removed from the filter beds and discharged from the system when the bed is washed by a reverse flow in the ordinary way.

This high velocity upward flow has the advantage of maintaining the bed of reacting material in a relatively open condition and in a state of agitation which tends to keep the particles clean by removing impurities therefrom.

In order to clean the bed which may become partially clogged by the deposition of impurities in the water, and to remove any gelatinous film which may be formed, as when sodium silicate is used as the reacting material, the water in the reacting chamber may be run out at desired intervals, thus causing a reverse flow within the chamber and the settlement and agitation of the bed therein.

Alternatively, the cleansing of the bed may be effected by a reverse flow of water under pressure.

The agitation of the bed during the washing operation may be enhanced by introducing air into the lower end of the chamber so that it will pass upwardly through the filter bed.

In the treatment of some waters, it may be found desirable to introduce air continuously and this is availed of in the present invention by introducing it in such a position that it will pass through the bed and assist in the agitation thereof, thus facilitating the automatic cleaning of the said bed.

A further feature of the invention consists in mixing the bed of reacting material with sharp granulated inert material such for example as sand, whereby the abrasive action of the sharp material caused by the normal agitation of the bed will facilitate the removal of the film.

The sand or like material also assists the cleaning action when the reacting chamber is being emptied or subjected to a reverse flow of wash water as above stated.

In lieu of causing the water to pass upwardly through the bed of reacting material it may pass downwardly therethrough, in which case mechanical agitating means, such as rakes, may be provided to permit of the cleaning of the bed at desired intervals.

As an alternative to providing a granulated bed of reacting material, the material may be used in the form of blocks over which the water to be treated is passed, and abrasive material, such as sand, is preferably used in conjunction therewith, for the purpose of assisting in the removal of any film or impurities deposited thereon.

The reacting material may conveniently be accommodated within a compensating chamber interposed between coagulant supplying mechanism and the filter beds.

Alternatively, the compensating chamber may be arranged in the effluent pipe of the filtered water, in which case the reacting material is preferably one which does not produce insoluble products by reaction with the water.

If desired, a portion only of the water undergoing filtration may be passed through the compensating chamber whereby the proportionate amount of alkaline reagent going into solution may be controlled within desired limits.

When it is desired to produce alkalinity beyond that required to neutralize any excess of coagulant reagents or the products of their reaction with the water, a suitable additional reagent may be added to the water before it passes to the compensating chamber, said reagent being added either with the coagulants or separately therefrom. Ammonium salts, such as ammonium sulphate or chloride, are particularly advantageous for this purpose.

In addition to correcting the acidity of the water, the presence in the compensating chamber of alkaline and ammonium compounds produced by reaction with the substances above mentioned favorably conditions the water for sterilization with chlorine.

The ammonium salts, such as the sulphate or chloride hydrolize in water even though the solution may be neutral, i. e. pH7 with any free hydrogen ions present. When this water, however, is passed over a suitable alkaline substance in the compensating chamber, particularly sodium silicate, then the hydrolyzed acid will combine with the soda, forming sodium sulphate or chloride, which is soluble in water. The ammonia cannot combine with the silicon, so that free ammonia is formed; that is also soluble in water; therefore, the alkaline reaction ultimately is due to the presence of this ammonia and not to the soda. Where free $CO_2$ is also present in the water, this will combine to form complex ammonium carbonates which readily decompose and have, therefore, an alkaline reaction.

When ammonium alum is employed as the coagulant, then the formation of alkaline ammonium salts as well as the correction of the alum acidity is accomplished in the compensating chamber when the latter is charged with suitable materials, particularly alkali silicates.

That part of the process above described which relates to the treatment with alkaline material is more specifically illustrated in one preferred form of embodiment in the accompanying drawing, in which:—

Figure 1 is a view in sectional elevation of a compensating device constructed in accordance with the present invention.

Figure 2 is a view in sectional plan of the chamber shown in Figure 1;

Figure 3 is a view in sectional elevation showing a modified construction of compensating device; and Figure 4 is a view in sectional plan taken on the line 4—4 of Figure 3.

Now, referring to Figure 1, the reference numeral 10 designates a compensating chamber of vertical cylindrical formation having an inlet pipe 11 connected to the center of its lower end, and a delivery pipe 12 fitted to an extension 13 on the upper end thereof.

The delivery pipe 12 may pass direct to a filter chamber of the gravity or pressure type, or alternatively it may communicate with a distributor (not shown) by means of which the water passing thereto is delivered to a plurality of filter beds.

The inlet pipe 11 communicates with a diametrically disposed header 13 arranged within, and adjacent to the bottom of, the chamber 10, and a plurality of spaced hollow supports 14 mounted on the header carry transversely disposed pipes 15 perforated preferably on their undersides and retained in position by means of clamping members 16, fitted to the header.

This arrangement of perforated pipes 15 ensures an even distribution of the incoming water over the area of the chamber 10.

A bed 17 of gravel or the like is disposed in the bottom portion of the chamber and a layer of granulated reacting alkaline material 18 is disposed above the gravel layer. As previously stated, this reacting material may comprise broken limestone, magnesite or any other alkaline substance, either natural, artificial or synthetic, having the property of being substantially insoluble or only slightly soluble in neutral water, but which is more soluble in water having an acid reaction, the solubility thereof increasing with the acidity of the water.

The mouth of the delivery pipe 12 is preferably unobstructed by baffles for a purpose hereinafter set forth.

In operation, the water before entering the lower end of the compensating chamber and passing upwardly therethrough has been subjected to treatment with one or more coagulants, such for example as alum and aluminium sulphate, the coagulant being introduced in any suitable condition either as a solid or liquid and by any known means not forming part of the present invention.

In passing through the bed of reacting alkaline material sufficient material goes into solution with the water to correct any acidity thereof, the acidity being due either to the previous introduction of the coagulants or to the natural condition of the water undergoing treatment.

The water then passes from the top of the compensating chamber to one or more filter beds in the usual way, and, as a result of its treatment with the alkaline material, the effluent will not produce an acid reaction or its acidity will be so reduced as to render it satisfactory for those processes in which water not treated in this way would be deleterious.

The velocity of the water passing upwardly through the chamber 10 is preferably sufficient to maintain the bed therein in a state of partial suspension, similar to the effect produced by the reverse high velocity wash to which the filter beds of both gravity and pressure filters are frequently subjected for cleansing purposes. In this way, the bed is maintained in a somewhat open condition whereby the passage of the water therethrough is facilitated, and the constant agitation tends to keep the surfaces of the particles clean and reactive.

A further important advantage of the high velocity upward flow of water through the treating chamber is that light insoluble residues of the reacting material and insoluble products of reaction are automatically discharged from the treating chamber and delivered to the filter bed or beds. As previously stated, in some cases the formation of a filtering film on the filter bed is thereby facilitated; and furthermore, when the filter bed is washed by a reverse flow of water therethrough, the insoluble material is discharged from the system.

For this reason, the use of baffles or screens for the end of the discharge pipe 12 is preferably avoided, as hereinbefore set forth.

In some cases, however, it may be found necessary to provide a screen at the upper end of the chamber to retain the bed of reacting material in position.

In order to facilitate the normal cleansing action of the bed, the alkaline material may be admixed with sand or other material which will have an abrasive action on the alkaline material and tend to remove any gelatinous film forming thereon.

It will readily be understood that to some extent the bed of gravel and limestone or other reacting alkaline material within the compensating chamber will act as a strainer, so that coagulated impurities in the water will be deposited thereon. These deposits require removal at intervals, and the cleansing operation is preferably effected by merely running the water out of the chamber 10 as by opening the lower end thereof to waste by means of a valve 19. This reverse flow of water through the chamber serves to remove impurities from the bed therein and discharge the same to waste, after which normal running is resumed.

To facilitate the discharge of the water when cleaning the bed, and also to assist in agitating the said bed to effect a thorough cleansing thereof, means are provided for introducing air to the bottom of the chamber during the cleansing operation. For this purpose, a perforated pipe ring 20 is disposed within the chamber below the header 13 and is connected at one point to an air pipe 21 passing through the wall of the chamber and provided with an external control valve 22.

When using this device, it is preferred to allow the level of the water within the compensating chamber to fall somewhat before opening the air valve 22, so that a partial vacuum is formed at the top of the chamber and the action of the air passing upwardly to the top of the chamber serves to agitate the bed of material and remove deposits therefrom.

In some cases, when it is necessary to aerate the water undergoing treatment, this may be advantageously effected by an airpipe such as 20 arranged below the bed 18 of reacting material, or by other means equivalent thereto.

It will be understood that, in this case, the air is forced in continuously or when required so that it serves the dual purpose of aerating the water and agitating the reacting bed.

In an alternative form of the invention illustrated in Figures 3 and 4 of the drawing, the compensating chamber 10 is provided with upper and lower locating plates 23 and 24 between which are arranged a central core 25 of reacting material and a concentric outer tube 26 of the same material, thus forming two annular passages 27 and 28 through which the water passes on its way to the filter beds.

It will be understood that the surface action between the alkaline reacting material and the water passing thereover results in sufficient material going into solution to correct the acidity of the water.

In order to keep the surfaces of the reacting material 25 and 26 relatively free of film and impurities, the passages 27 and 28 are preferably filled with abrasive material 32, such as sand, supported above a layer 32' of gravel in the bottom of the chamber. Impurities collecting in this bed of sand may be removed at intervals by running the water out of the chamber as described with reference to the construction illustrated in Figures 1 and 2, and air is preferably introduced at the lower end of the chamber during the reverse cleansing flow.

In lieu of passing all of the water to be filtered through the compensating chamber 10, portion thereof may be by-passed direct to the filter chamber 12', as also illustrated in Figure 3, wherein the supply pipe 11 is provided with a branch 29 communicating with the delivery pipe 12 of the filter chamber, the branch 29 and the inlet pipe 11 being provided with valves 30 and 31 respectively, and by the adjustment of which the proportion of the water passing through the compensating chamber may be regulated as desired.

The proportion of the water to be passed through the compensating chamber will be governed by the solubility of the reacting material therein, the condition of the water to be treated, and the desired condition of the effluent water.

It will be further apparent that the particular reacting material or mixture of reacting materials to be used will be determined by the nature of the water to be treated, the particular coagulant or coagulants employed, and the availability of the said reacting materials.

Whilst, in the examples described and illustrated, the compensating chamber is arranged in advance of the filter chamber or chambers, it will be understood that, if desired, the said compensating chamber may be connected to the effluent pipe of the filter plant so that the necessary correction for acidity is effected after the water has been filtered. When this is done, however, it is preferred to use an alkaline reacting material which will not produce any insoluble products which would be discharged with the effluent water.

I claim:

1. In a method of water purification, the steps of coagulating impurities in the water by reaction with coagulants capable of producing acid conditions therein, adding an ammonium salt to the water, and subjecting the water to treatment with an alkaline material which is substantially insoluble in neutral water but which is increasingly soluble in acidic water, and removing the coagulated impurities.

2. In a method of water purification, the steps of coagulating the impurities in the water by reaction with a coagulant capable of producing acid conditions therein, subjecting the water to treatment with one of the following materials, viz: alkali metal silicate, alkaline earth metal silicate, calcium aluminate slag, and removing the coagulated impurities.

3. In a method of water purification according to claim 2, the use of more than one of the materials enumerated therein, viz: alkali metal silicate, alkaline earth metal silicate, calcium aluminate slag.

4. In a method of water purification according to claim 2, the steps of subjecting the water to treatment with a coagulant capable of producing acid conditions therein, passing the water upwardly at a relatively high velocity through the chamber containing the alkaline material having the property of being only slightly soluble in neutral water but increasingly soluble in acidic water, and then passing the water through a filter.

5. In a method of water purification, the steps of coagulating impurities in the water by reaction with a coagulant capable of producing acid conditions therein, passing the water upwardly at a relatively high velocity through a mixture of abrasive material and broken alkaline material having the property of being only slightly soluble in neutral water but increasingly soluble in acidic water, and then passing the water through a filter.

6. In a method of water purification, the steps of coagulating impurities in the water, passing the water upwardly at a relatively high velocity through a chamber containing alkaline material, then passing the water through a filter and discharging the water from the lower end of the chamber at predetermined intervals while introducing air into the lower portion of the chamber from the bottom end thereof.

7. In a method of water purification, the steps of treating the water with an ammonium salt and a coagulant capable of producing acid conditions therein, then subjecting the water to contact with alkaline reacting material having the property of being only slightly soluble in neutral water but increasingly soluble in acidic water, and finally passing the water through a filter.

8. In a method of water purification according to claim 2, the step of incorporating an ammonium salt in the water prior to subjecting said water to treatment with one of the reacting materials, whereby an alkaline condition will be produced in the water.

9. In a method of water purification according to claim 2, the step of subjecting the water to treatment with one of the following materials, viz: limestone, magnesium carbonate, dolomite or marble chips.

10. In a method of water purification according to claim 2, the steps of passing the water upwardly at a relatively high velocity in contact with the reacting material, and then passing the water through a filter.

11. In a method of water purification according to claim 2, the steps of passing the water upwardly at a relatively high velocity through a bed of the reacting material in a broken condition and then passing the water through a filter.

12. In a method of water purification, the steps of coagulating impurities in the water by the addition thereto of ammonium alum, then subjecting the water to contact with alkaline reacting material having the property of being only slightly soluble in neutral water but increasingly soluble in acidic water, and then removing the coagulated impurities.

MICHAEL JAMES MARTIN.